No. 730,479. Patented June 9, 1903.

UNITED STATES PATENT OFFICE.

JOHN T. SALTIEL, OF DENVER, COLORADO.

MANUFACTURE OF ARTIFICIAL STONE.

SPECIFICATION forming part of Letters Patent No. 730,479, dated June 9, 1903.

Application filed July 3, 1902. Serial No. 114,289. (No specimens.)

*To all whom it may concern:*

Be it known that I, JOHN T. SALTIEL, a citizen of the United States, residing at Denver, in the county of Arapahoe and State of Colorado, have invented certain new and useful Improvements in Manufacture of Artificial Stone, of which the following is a specification.

My discovery relates to the manufacture of artificial stone; and the invention therein which constitutes my improvement will be stated in the claims appended hereto.

In making my composition I thoroughly mix while dry the following ingredients in about the proportions stated, measured by volume, to wit: Granite, from one-inch mesh to a powder, fifteen parts; powdered or fine-crushed glass or glass slag, two parts; sand grit, forty parts; pebbles, thirteen parts; clean hard cinder-clinkers, one to one-fourth inch mesh, eight parts; ochers, 7 parts; hydraulic cement, fifteen parts. The whole is now well soaked and mixed with water in which has been stirred a liquid prepared as follows: Add one-fourth pound of suet or tallow to one quart of rain or soft water, boil to a soup, and cool. Next add about three dozen crushed egg-shells to one quart of vinegar, boil, and cool. Next take four quarts of rain or soft water, heat to lukewarm, and then add, preferably in the following order, one quart of acetic acid, then the suet soup or tallow above described, then the egg-shell and vinegar mixture, and then boil the same and allow it to cool. From two to five quarts of this liquid is kept in sealed vessels until it is stirred in the water and used.

It has been found in practice that my composition should be dampened and mixed to about the consistency of plastic mortar. It should not be so wet as to cause the cement to run away; but it is better to have it too wet than too dry. On a damp day the proportion of the liquid to the water may be increased.

When prepared as stated above, my composition is ready and suitable to be molded into tile, posts, or other desirable shapes, or it may be laid as a pavement or wall. It is as strong as granite and stands about the same wear. It is not affected by the weather.

I do not claim herein the described process in the manufacture of artificial stone, since claims to the invention embodied in said process are made the subject of a separate and distinct application for a patent filed by me of date November 28, 1902.

I claim—

1. The composition herein described consisting of crushed granite, powdered or fine-crushed glass, sand grit, clean hard cinder-clinkers, pebbles, hydraulic cement, ochers, rain-water suet or tallow soup, crushed egg-shells boiled in vinegar, acetic acid and water in or about the proportions specified for use in artificial-stone making.

2. Artificial-stone-making components one of such components consisting of a dry mixture of crushed granite, fine-crushed glass, sand grit, hard cinder-clinkers, pebbles, hydraulic cement, and ochers, the other of said components consisting of a liquid mixture of soft-water suet or tallow soup, crushed egg-shells boiled in vinegar, acetic acid and water, said components being united in and about the proportions specified.

3. An artificial-stone-making component consisting of a dry mixture of crushed granite, crushed glass, sand grit, hard cinder-clinkers, pebbles, hydraulic cement and ochers and united in or about the proportions specified.

4. As a new manufacture for use in artificial-stone making, a compound consisting of crushed granite, crushed glass, sand grit, pebbles, cinder-clinkers, ochers, and hydraulic cement, reduced to the condition of plastic mortar for use by a liquid compound.

In testimony whereof I affix my signature in presence of two witnesses.

JOHN T. SALTIEL.

Witnesses:
A. ROLAND JOHNSON,
WELLS H. MOSES.